United States Patent
Mendenhall (10) Patent No.: US 6,621,253 B2
(45) Date of Patent: Sep. 16, 2003

(54) AMPLIFIER HAVING A VARIABLE POWER FACTOR

(75) Inventor: Eric Mendenhall, Dove Canyon, CA (US)

(73) Assignee: Gibson Guitar Corp., Nashville, TN (US)

( * ) Notice: Subject to any disclaimer, the term of this patent is extended or adjusted under 35 U.S.C. 154(b) by 0 days.

(21) Appl. No.: 10/116,887

(22) Filed: Apr. 5, 2002

(65) Prior Publication Data

US 2003/0052653 A1 Mar. 20, 2003

Related U.S. Application Data

(60) Provisional application No. 60/323,569, filed on Sep. 20, 2001.

(51) Int. Cl.[7] .............................. G05F 1/70; H03F 3/20
(52) U.S. Cl. ........................................ 323/210; 323/222
(58) Field of Search ................................ 323/210, 222, 323/282, 283, 208; 363/37, 41, 39, 80, 81; 330/297, 289, 298, 265, 263, 205

(56) References Cited

U.S. PATENT DOCUMENTS

| | | | |
|---|---|---|---|
| 4,484,150 A | 11/1984 | Carver | 330/297 |
| 4,652,769 A | 3/1987 | Smith et al. | |
| 4,661,764 A | * 4/1987 | Mostyn et al. | 323/222 |
| 4,677,366 A | 6/1987 | Wilkinson | |
| 4,808,946 A | 2/1989 | Carver | |
| 4,855,890 A | 8/1989 | Kammiller | |
| 4,961,044 A | 10/1990 | Kravitz | |
| 5,099,918 A | * 3/1992 | Bridges et al. | 363/37 |
| 5,359,274 A | 10/1994 | Bandel | 323/207 |
| 5,396,194 A | * 3/1995 | Williamson et al. | 330/297 |
| 5,416,687 A | 5/1995 | Beasley | |
| 5,510,753 A | 4/1996 | French | |
| 5,532,917 A | 7/1996 | Hung | |
| 5,543,753 A | 8/1996 | Williamson | |
| 5,606,289 A | 2/1997 | Williamson | |
| 5,767,744 A | 6/1998 | Irwin et al. | |
| 6,023,153 A | 2/2000 | Fink | |

* cited by examiner

Primary Examiner—Rajnikant B. Patel
(74) Attorney, Agent, or Firm—Waddey & Patterson; Lucian Wayne Beavers (57) ABSTRACT

A multiple power factor audio amplifier with a power draw up to a maximum amplifier power draw flowing through at least two power flow circuits with at least one circuit including a power factor corrector electrically connected between the amplifier and input terminals. One embodiment including a power factor corrector sized to provide a first output less than the maximum amplifier power draw of the amplifier and a high output power factor bypass adapted to provide a second output to supplement the first output when the amplifier power draw exceeds the first output. Also described are methods for controlling the amplifier demand power factor including adjusting the draw of a first portion of the direct current power at a first level to improve the power factor of an input demand at the rectifier to provide a first part of the demanded amplifier power; and transferring a second portion of the direct current power without power factor correction to provide a second part of the demanded amplifier power.

20 Claims, 10 Drawing Sheets

AMPLIFIER HAVING A VARIABLE POWER FACTOR

APPLICATION FOR UNITED STATES LETTERS PATENT

This application claims benefit of co-pending U.S. patent application Ser. No. 60/323,569 filed Sep. 20, 2001, entitled "Amplifier Having A Variable Power Factor" which is hereby incorporated by reference.

Be it known that I, Eric Mendenhall, a citizen of United States, residing at 36 Wakonda, Dove Canyon, Calif. 92679; have invented a new and useful "Amplifier Having a Variable Power Factor".

BACKGROUND OF THE INVENTION

The present invention relates generally to the construction of audio power amplifiers, and more particularly to audio power amplifiers utilizing a power factor correction circuit.

Several United States Patents cover various aspects of power supplies, amplifiers, and power factor correction circuits. These include: U.S. Pat. No. 4,652,769 issued to Smith, et al. on Mar. 24, 1987; U.S. Pat. No. 4,677,366 issued to Wilkinson, et al. on Jun. 30, 1987; U.S. Pat. No. 4,808,946 issued to Carver, et al. on Feb. 28, 1989; U.S. Pat. No. 4,855,890 issued to Kammiller on Aug. 8, 1989; U.S. Pat. No. 4,961,044 issued to Kravitz on Oct. 2, 1990; U.S. Pat. No. 5,396,194 issued to Williamson, et al. on Mar. 7, 1995; U.S. Pat. No. 5,416,687 issued to Beasley on May 16, 1995; U.S. Pat. No. 5,510,753 issued to French on Apr. 23, 1996; U.S. Pat. No. 5,532,917 issued to Hung on Jul. 2, 1996; U.S. Pat. No. 5,543,753 issued to Williamson on Aug. 6, 1996; U.S. Pat. No. 5,606,289 issued to Williamson on Feb. 25, 1997; U.S. Pat. No. 5,767,744 issued to Irwin, et al. on Jun. 16, 1998; and U.S. Pat. No. 6,023,153 issued to Fink on Feb. 8, 2000. Each of these patents is hereby incorporated by reference.

U.S. Pat. No. 4,855,890, issued to Kammiller on Aug. 8, 1989 discloses a power factor correction circuit. In describing FIG. 4, the patent discloses that the capacitors for the power factor correction circuit may be switched into the circuit as the load increases. In describing FIG. 7B, this patent discloses a inductance connected in parallel with a triac such that the inductor of the power factor correction circuit may be removed from circuit as the load current increases leaving only the power factor correction capacitors. The switching of the capacitors is used to provide and change the amount of an initial half cycle charge and the switching of the inductors is used to slow and change the rate of current change to the vary overall the characteristics of the power factor correction over the load range.

U.S. Pat. No. 5,563,781, issued to Clauter et al. on Oct. 8, 1996 discloses a "Dual-Mode Power Converter" for single-phase AC to DC power sources. This patent describes the use of a conduction mode and a switchmode power converter. As noted in Column 2, Lines 61–65, the switchmode power converter handles a fraction of the full output power and the peak power is conducted directly though the conduction-mode current path. In col. 3, lines 9–20, the patent describes how the control method is used to actively shut down the switchmode power converter when the power demand is above a specified level.

U.S. Pat. No. 6,023,153 issued to Fink on Feb. 8, 2000 discloses an "Audio Amplifier Having Power Factor Correction." This patent teaches an audio amplifier including a very limited type of power factor correction using a power factor correction circuit for receiving the sinusoidal line voltage from the AC source and controlling the shape of the input current drawn from the AC source to correspond to the shape of the input voltage in order to minimize harmonic generation, the power factor correction circuit producing an intermediate source of voltage. As noted by the teachings of this patent, the power factor correction circuit must receive a sinusoidal line voltage and create a substantially higher intermediate voltage to feed the switching power supply.

Also of interest is Dierber, Kenneth W., *Application Note, APT9502, Low Cost* 1000 *Watt,* 300 *Volt RF Power Amplifier for* 13.56 *Mhz,* (RF Expo east 1995). This application note discloses that the DC to DC converter and the power supply operating from the AC mains is usually a significant cost of the overall system. Additionally, this application note discloses that power factor correction has been known as considered as being required due to the implementation of standards for equipment sold in Europe and expected to be implemented in the rest of the world.

Of additional note is Fairchild Semiconductor, Application Note 42030, Thoery and Application of the ML4821 Average Current Mode PFC Controller (Oct. 25, 2000). This application note discloses the use of fault control loops, with an example of one being used for overvoltage protection. On pages 9 and 10, a surge bypass diode is discussed to help to bypass surges at the input line during start-up to prevent the saturation of inductor L1.

These teachings fail to provide the advantages of the present invention. What is needed, then, is an Amplifier Having A Variable Power Factor.

SUMMARY OF THE INVENTION

The present invention is directed to an audio amplifier connected to the AC mains that is configured to efficiently use power factor correction by providing at least two levels of power factor control. One example of the multiple control levels is limiting the use of a power factor correction circuit to typical power draw conditions. The amplifier is designed to have a high power factor under typical power draw conditions by utilizing a power factor correction circuit. However, the amplifier limits the size and expense of the power factor correction circuit by allowing for a low power factor under full power conditions.

Since normal operation of the amplifier with audio program material will result in an output power of typically ⅛ to ⅓ of the maximum output power, a first circuit can be used to achieve power factor correction and sized to provide high power factor only up to the typical power draw, and a low power factor high current rectifier is used when the amplifier is driven above the typical power level, as may occur during testing.

In one disclosed embodiment, the power factor correction circuit utilizes a constant sinusoidal current.

In another disclosed embodiment of the invention, the power factor correction circuit utilizes an intermediate cusp current.

In a still further one disclosed embodiment, the power factor correction circuit utilizes an intermediate sinusoidal current. In this embodiment of the present invention, an improved and consolidated design is provided by combining the cusp control method and sine wave modes of operation. In the first two described embodiments, the sine circuit low current power factor corrector operates with a sine output under all conditions and the cusp version operates with cusp current output that is shut down so that the output is supplemented by the bypass circuitry. The advanced version operates with the low current power factor corrector operating with a sine output at low currents and being overridden by the bypass circuitry to output a cusp output at high currents. The advanced circuit relies on maintaining a lower forward voltage drop across the bypass diode than across the series elements in the power factor corrector. This can be accomplished by using a diode with a higher inherent voltage drop in the power factor corrector, or by the use of a second rectifier in series with the power factor corrector.

Accordingly, it is an object of the present invention to provide improved amplifier designs utilizing a variable power factor.

Another object of the invention is the provision of an amplifier design which provides a high power factor under typical power draw conditions, and a low power factor under full power draw conditions.

Yet a further object of the present invention is the provision of an amplifier having a variable power factor utilizing a sinusoidal current circuit. Still another object of the invention is the provision of an amplifier having a variable power factor utilizing a cusp current circuit.

Other and further objects, features, and advantages of the present invention will be readily apparent to those skilled in the art upon a reading of the following disclosure when taken in conjunction with the accompanying drawings.

DESCRIPTION OF THE PREFERRED EMBODIMENTS

Figure 1:
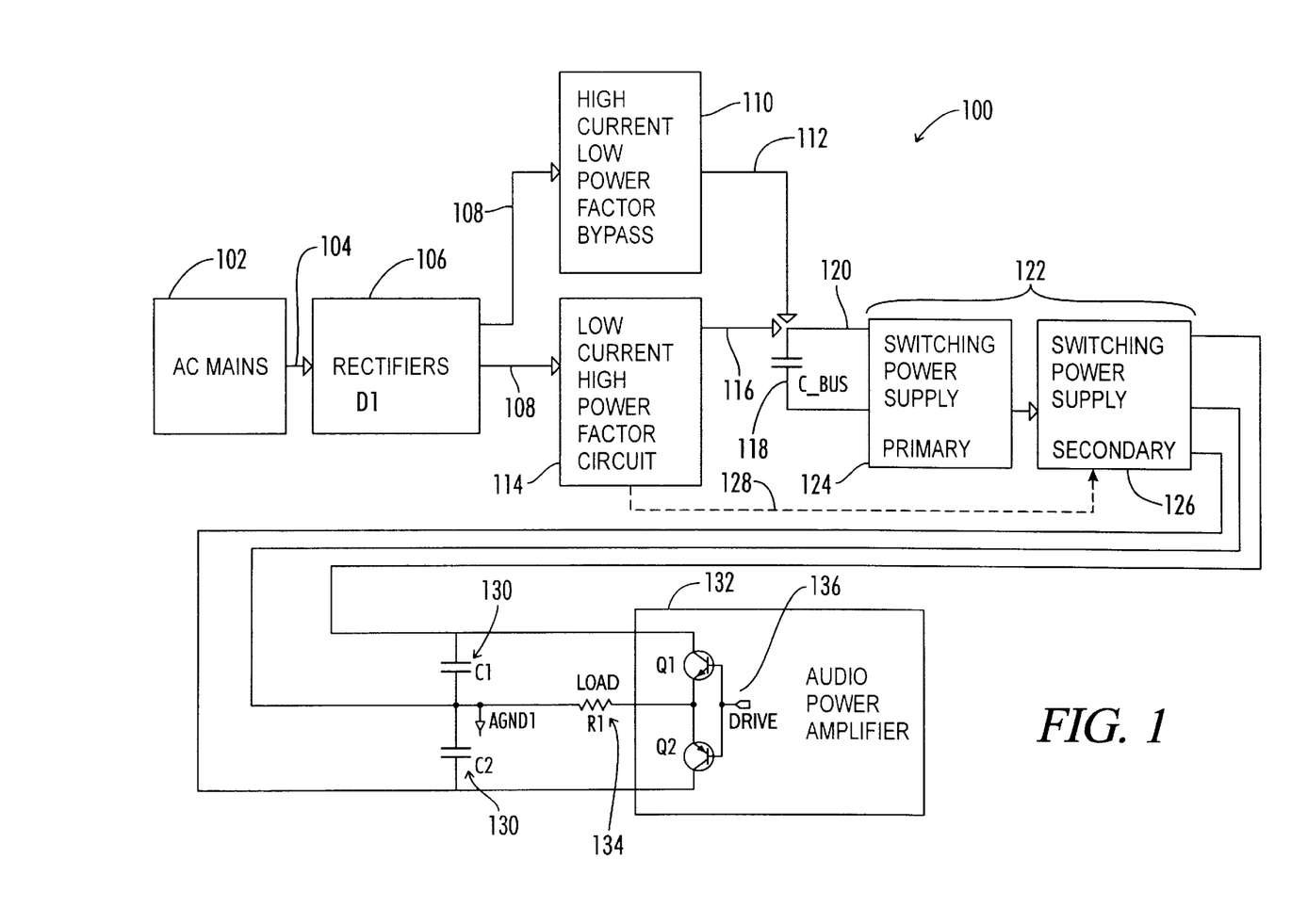
FIG. 1 is a block diagram of an amplifier having a variable power factor utilizing a sinusoidal current circuit.

Referring now to the drawings, and particularly to FIG. 1, a block diagram is there shown of an audio amplification device 100 having a sinusoidal current draw high power factor circuit 114 and a conventional low power factor supply 122. The audio amplification device 100 is designed to amplify an input audio signal 136 with power from a sine wave power source 102, such as the AC mains found in most residential buildings. The audio amplification device includes input terminals 104, such as a standard household plug, that may be connected to receive the power from the sine wave power source 102. A rectifier 106 is electrically connected to the input terminals 102 and is adapted to convert the power from the sine wave power source 102 to a unipolar rectified sine wave.

The audio amplification device also includes a low current high power factor corrector circuit 114 electrically connected between the switching power supply 122 and the input terminals 104. The high power factor circuit 114 draws a current wave form through the rectifier 106 that is proportional to the AC line 102 voltage. The low output high power factor corrector 114 is sized to provide a first output 116 less than the maximum amplifier power draw of the amplifier 136. The high power factor circuit 114 is deliberately limited in capacity to only be capable of supplying high power factor current up to that required by a typical audio output signal of from about ⅛ to ⅓ maximum power. This reduces the size and cost of the components for low current power factor corrector 114.

The low current high power factor circuit 114 may put its first energy either into a primary side 124 or secondary side 126 of the switching power supply 122. The connection of low current high power factor circuit 114 to the primary side 124 is shown via the electrical conduit shown in solid lines and designated by the numeral 116. The alternative connection to the secondary side 126 of power side 122 is shown via an electrical conduit shown in dashed lines and designated by the numeral 128. The connection to primary side 124 via conduit 116 is preferred.

A high current low power factor rectifier 110, also known as a circuit bypass 110, is electrically connected in parallel with the low current power factor corrector 114 at a location between the rectifiers D1 and bus capacitor 118. The high output power factor bypass 110 is adapted to provide a second output 112 to supplement the first output 116 when the power draw of the amplifier exceeds the first output 116. The first output and second output are used to charge the bus capacitor 118 to provide combined power 120 to the switching power supply 122 including a switching power supply primary 124 and a switching power supply secondary 126. An audio power amplifier 132 is electrically connected to the switching power supply 122 to receive power through the rectifier 106. The output of the switching power supply 122 is connected to filter capacitors 130 before passing to the audio power amplifier 132. The present description is not meant to limit the application of the present invention to a particular class or type of amplifier.

The audio power amplifier 132 is adapted to amplify the audio input signal 136 using the direct current output signal 118. The audio power amplifier 132 is designed to work at a level that will have an amplifier operating power draw that varies with the load 134 characteristics and the amount of amplification applied to the audio input signal 136 up to a maximum amplifier power draw. Typically, amplifiers only operate with an average power output of approximately ⅛ to ⅓ of their full power output capability and thus, they have a typical operating power draw that is much less than the maximum amplifier power draw. Because the cost of adding power factor correction to handle the maximum operating power draw is a cost prohibitive endeavor, the present power factor correction design for an audio amplification device provides an improved power factor without requiring the burdensome circuit size and expense of a full size power factor correction circuit.

Figure 2A:
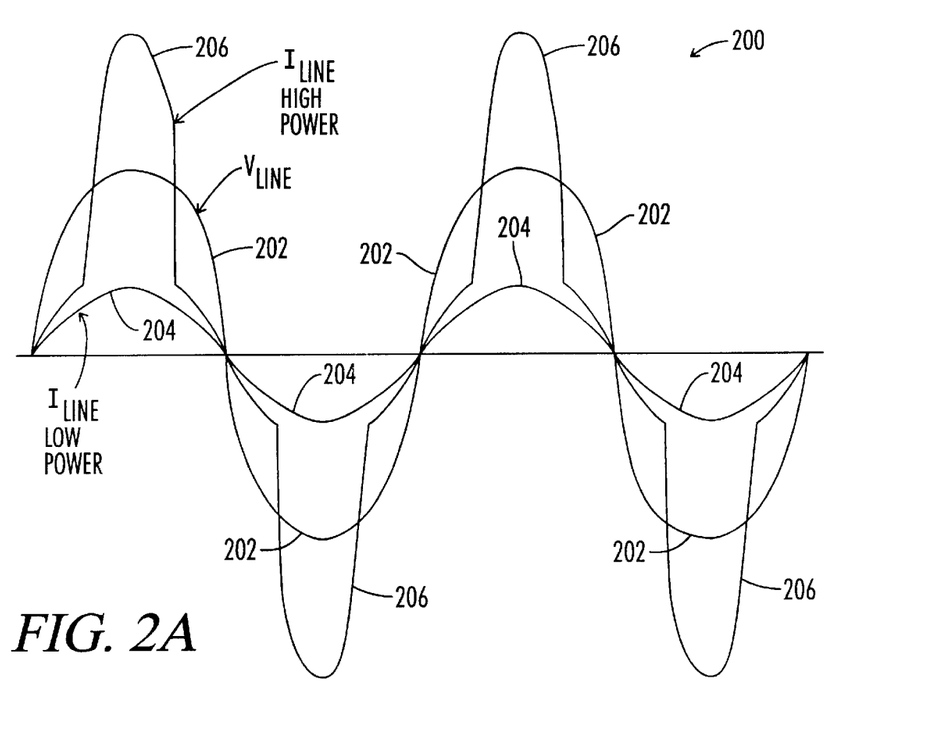
FIGS. 2A and 2B illustrate wave forms utilizing the sinusoidal current circuit.

Referring now to FIG. 2A, the waveforms for different signals in the audio amplification device 100 may be seen. As is well known, the input voltage is an alternating current signal VLINE as indicated by curve 202. Two different levels of current draw are shown for the audio amplification device 100.

A low level of input current ILINE LOW POWER, is indicated by the sinusoidal curve 204. The ILINE LOW POWER waveform curve 204 is formed with the high power factor circuit 114 when there is no current drawn from the low power factor rectifier 110. The sinusoidal shape provides a high power factor for the device 100.

The high level of input current ILINE HIGH POWER, is indicated by curve 206. The ILINE HIGH POWER waveform curve 206 is formed with the combined first output 116 and second output 112 of the high power factor circuit 114 and low power factor circuit 110. The shape of this waveform may be understood by referencing FIG. 2B.

Figure 2B:
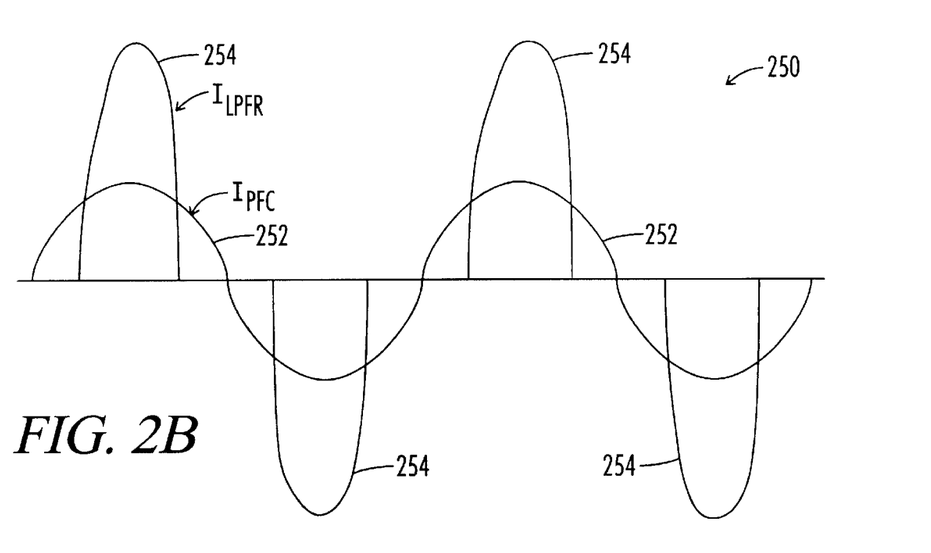

As shown in FIG. 2B, when the amplifier power draw exceeds the typical case, as it may under test conditions, the low power factor rectifier 110 detects the amplifier power draw exceeding the capability of the high power factor correction circuit 114 and enables the second output 112 to supplement the first output 116. Once the low power factor rectifier 110 becomes active, it draws current as shown as ILPFR and designated by curve 254. For this embodiment, the high power factor circuit 114 also remains active during this period to continue drawing current designated as IPFC and identified as curve 252. The sum of the two currents ILPFR and IPFC is shown as ILINE HIGH POWER designated as curve 206 in FIG. 2A.

Figure 3:
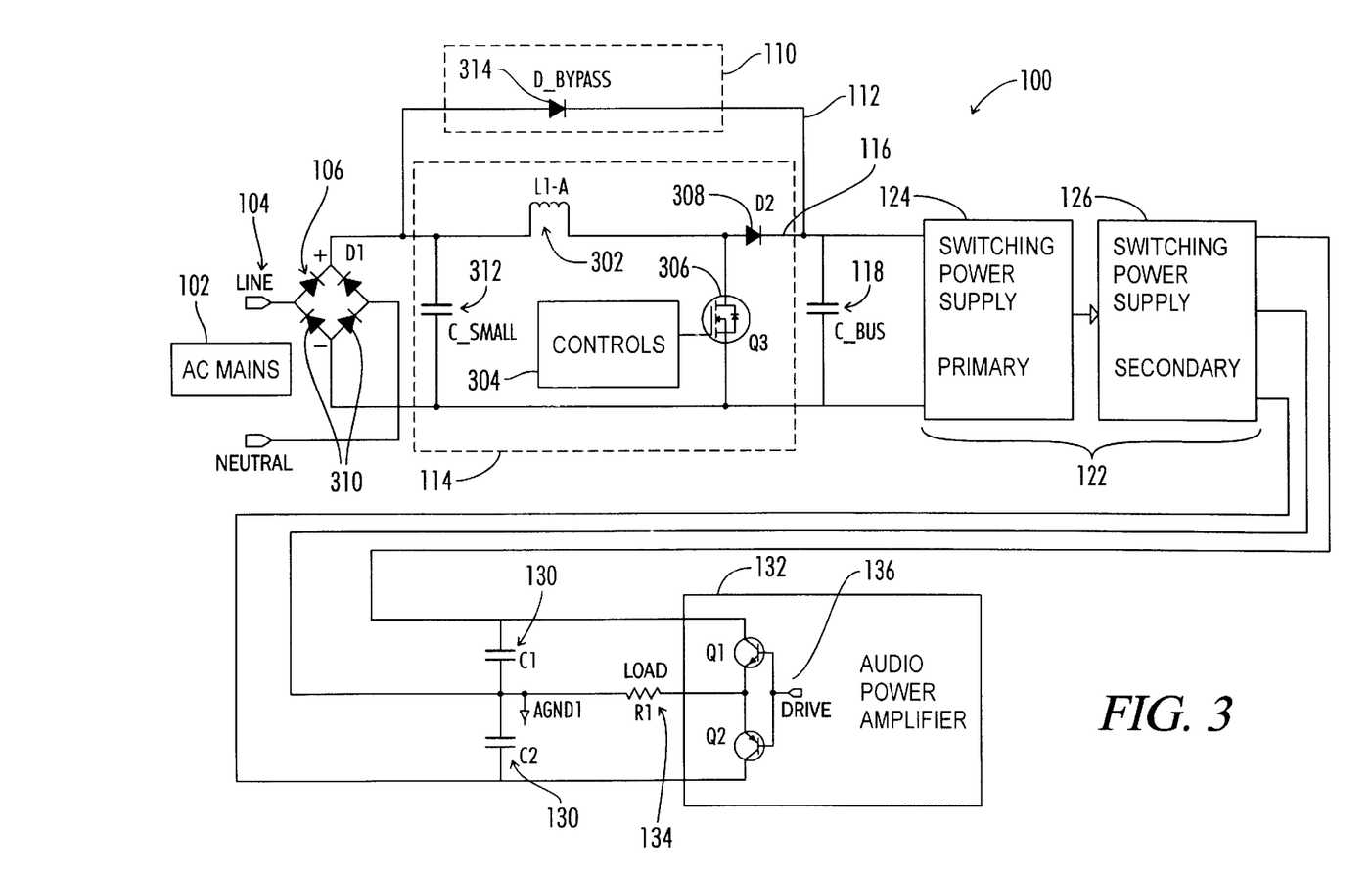
FIG. 3 is an electrical schematic drawing of an implementation of the system of FIG. 1 using a sinusoidal current circuit.

FIG. 3 is an electrical schematic of the preferred implementation of the system of FIG. 1 using the sinusoidal current circuit. As shown in FIG. 3, the bridge rectifier D1 formed from diodes 310 feeds the high power factor circuit 114 formed by C_SMALL 312, L1 302, Q3 306, and D2 308. The inductance L1 302 and the diode D2 308 are series connected and positioned in the path of the direct current signal from the rectifier 106. A controllable switch Q3 306 is connected between the inductance L1 302 and the diode D2 308 and positioned across the direct current signal form the rectifier 106. A control circuit 304 is connected to the controllable switch 306 and adapted to control the demand of the low current power factor corrector 114 through the rectifier 106 to be a continuous sine wave to substantially match the alternating current signal from the alternating current mains 102.

C_BUS 118 is fed by this high power factor circuit 114 until the amplifier power draw exceeds it's capability, then the low power factor rectification path through diode D_Bypass 314 takes over. One advantage to this simple system is that there is no specialized control circuitry involved over the normal power factor correction control circuitry 304. For this embodiment, where both the low current power factor corrector 114 and high current low power factor rectifier 110 operate at the same time, the low power factor rectifier 110 will operate in either an idle or a supply state, and the control circuit 304 of the low current power factor corrector 114 is adapted to operate the controllable switch regardless of the state of the high current low power factor rectifier 110.

The limits of the low current power factor corrector 114 must be set such that the maximum power delivered by the low current power factor corrector 114 is appropriate for the typical draw and the maximum power delivered by the combination of both outputs 116, 112 is appropriate for the maximum amplifier power draw. By setting the limit on the low current power factor corrector 114 at the typical power draw, power draw requirements from the amplifier 122 above this capability will drop the voltage on C_BUS 118 until D_BYPASS 314 is biased and activates to provide the alternative path.

Figure 4:
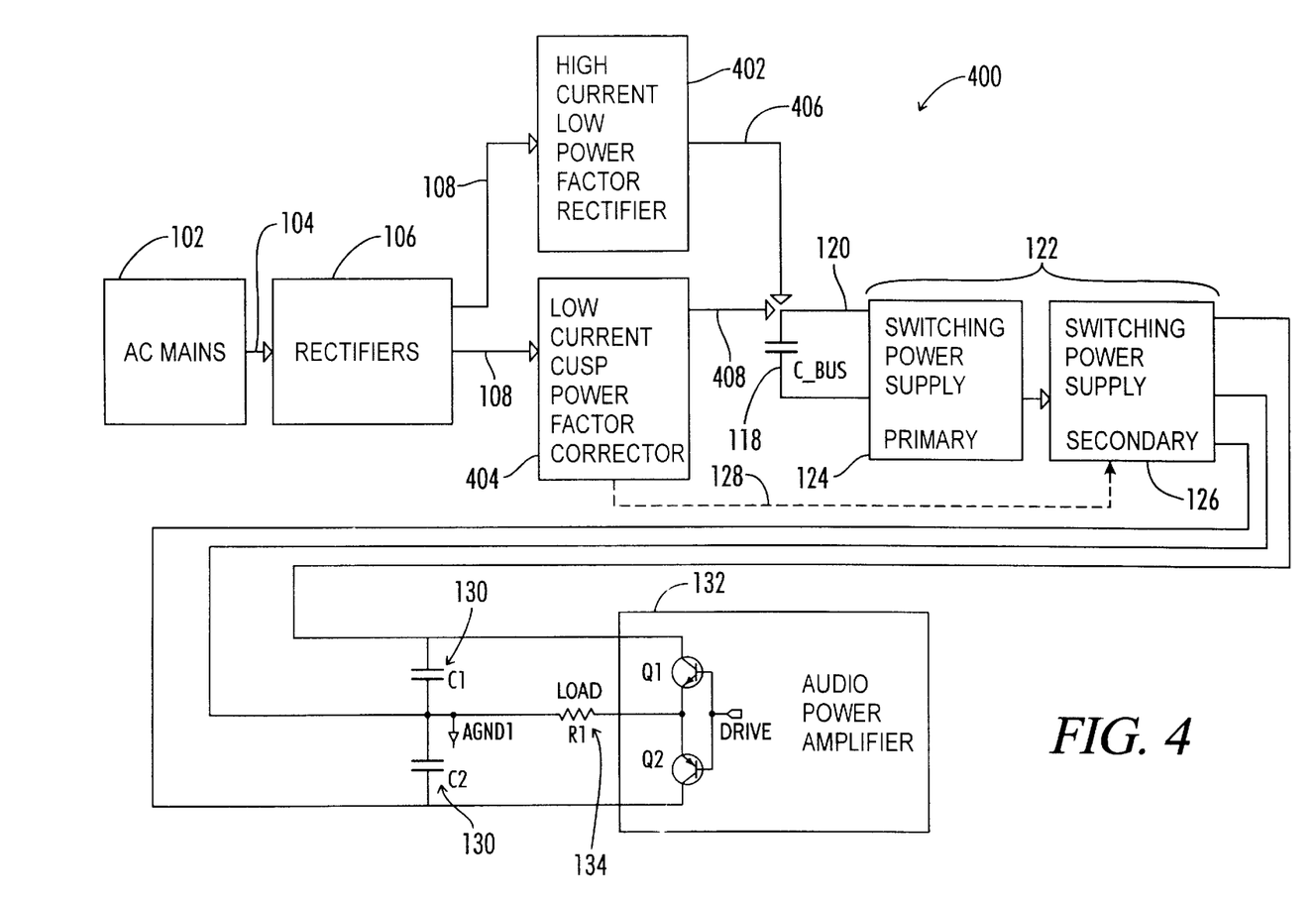
FIG. 4 is a block diagram showing a second embodiment of the invention utilizing a cusp current circuit.
Figures 5A, 5B:
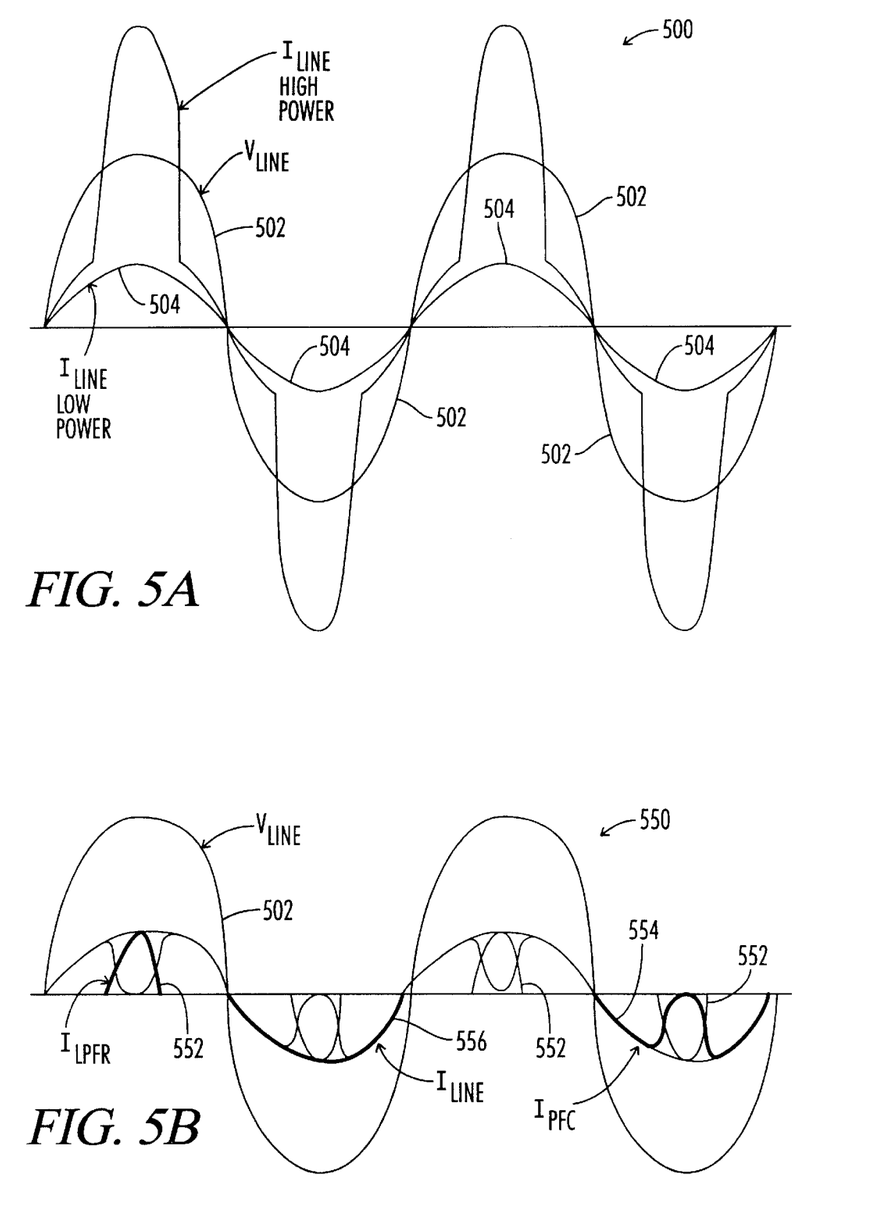
FIGS. 5A and 5B illustrate wave forms of the cusp current circuit.

Alternative Embodiment of Amplifier Having a Variable Power Factor Utilizing a Cusp Current Circuit As shown in FIG. 4, an audio amplification device 400 contains a cusp current power factor correction circuit 404 with a first output 408, which draws current both before and after the alternating current peaks on the power signal from the ac mains 102. The audio amplification device 400 also includes a high current low power factor rectifier 402 which supplies a second output 406 and draws current only at the alternating current peaks. The cusp current circuit 404 and the low power factor rectifier 402 operate concurrently to achieve a total line current draw at the AC mains 102 that is sinusoidal under typical power draw of about ⅛ to ⅓ maximum power. The operation of the cusp current circuit 404 is limited to a maximum output for this typical power draw.

Returning to FIG. 4, it is similarly noted that the cusp current circuit 404 may put energy into either a primary side 124 of switching power supply 122 via electrical conduit 408, or alternatively to the secondary side 126 of power switching supply 122 via conduit 128 indicated in dashed lines. The preferred implementation puts energy into the primary side 124 via electrical conduit 408 as illustrated in solid lines.

Figure 6A:
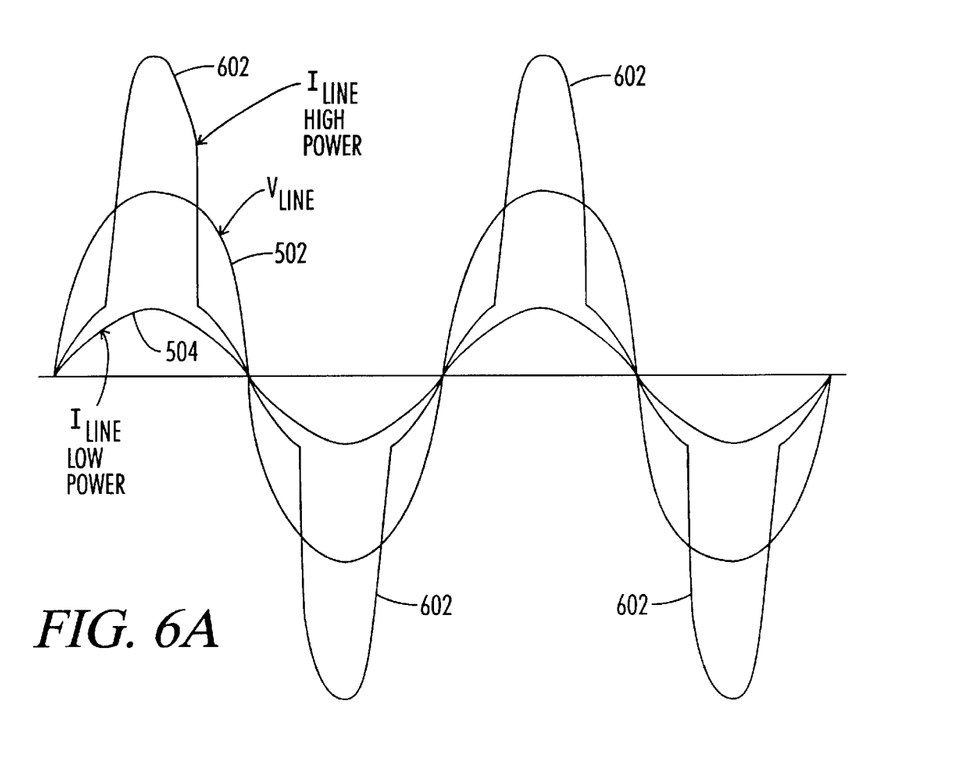
FIGS. 6A and 6B illustrate other wave forms of the cusp current circuit.
Figure 6B:
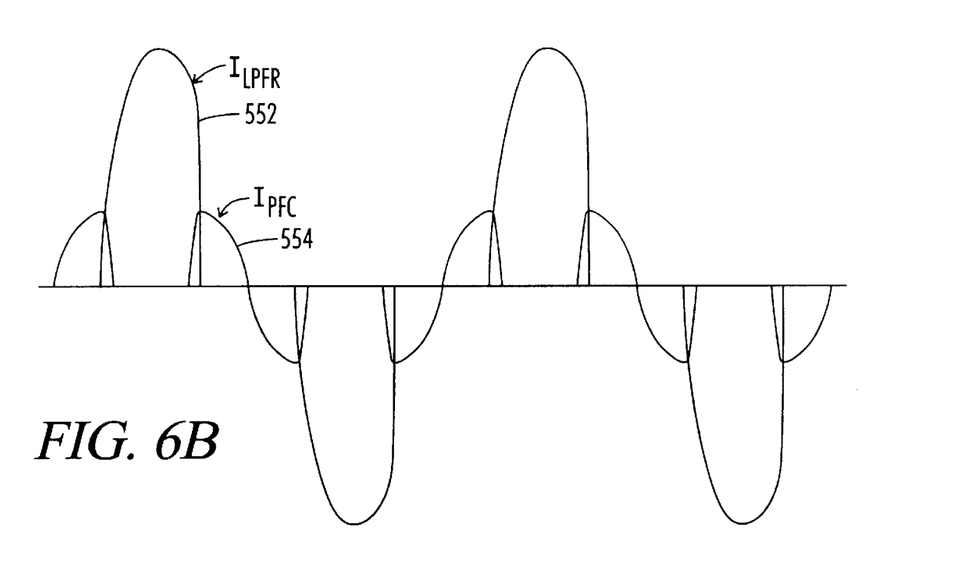

Referring now to FIGS. 5A through 6B, the various waveforms for the cusp device 400 may be seen. As noted in FIG. 5A, the AC line voltage is shown as VLINE, designated as curve 502, and the low demand input current is designated as ILINE LOW POWER designated as curve 504. The high current draw is shown as ILINE HIGH POWER, designated as curve 602. the make up of these curves may be seen by reviewing FIG. 6B As shown in FIG. 6B, the current from the high power factor cusp current circuit 404 is shown as IPFC and designated as curve 554. A negative portion of this signal has been bolded at the right side of the figure to clarify this signal from the other currents. In this manner, current is drawn over the entire cycle except at the peaks of the VLINE power input 502. The current draw from the low power factor rectifier 402 is shown as ILPFR, designated as curve 552 in FIG. 5B, and occurs at the line peaks. A positive segment of this signal has been bolded at the left side to clarify this signal. The sum of these two currents ILPFR 552 and IPFC 554 is shown in FIG. 5B as ILINE, designated as curve 556, which is sinusoidal or high power factor. A negative portion of the ILINE signal 556 has been bolded on the first negative half of the VLINE signal 502. From FIG. 5B, it may be understood how the combination of the first output 554 and second output 552 can be combined to form the sinusoidal power draw 556 from the AC mains to achieve a high power factor for the typical current draw condition.

When power draw exceeds typical conditions, as shown in FIGS. 6A and 6B, as it may under test conditions, the second output 112, shown as ILPFR 552 from the low power factor rectifier 402 dominates the demand. Although the first output 116 of the cusp current circuit 404 is still active as shown by IPFC 554, it is sized such that it is not able to keep the total current draw shown as ILINE HIGH POWER 602 as a sinusoidal signal.

Figure 7:
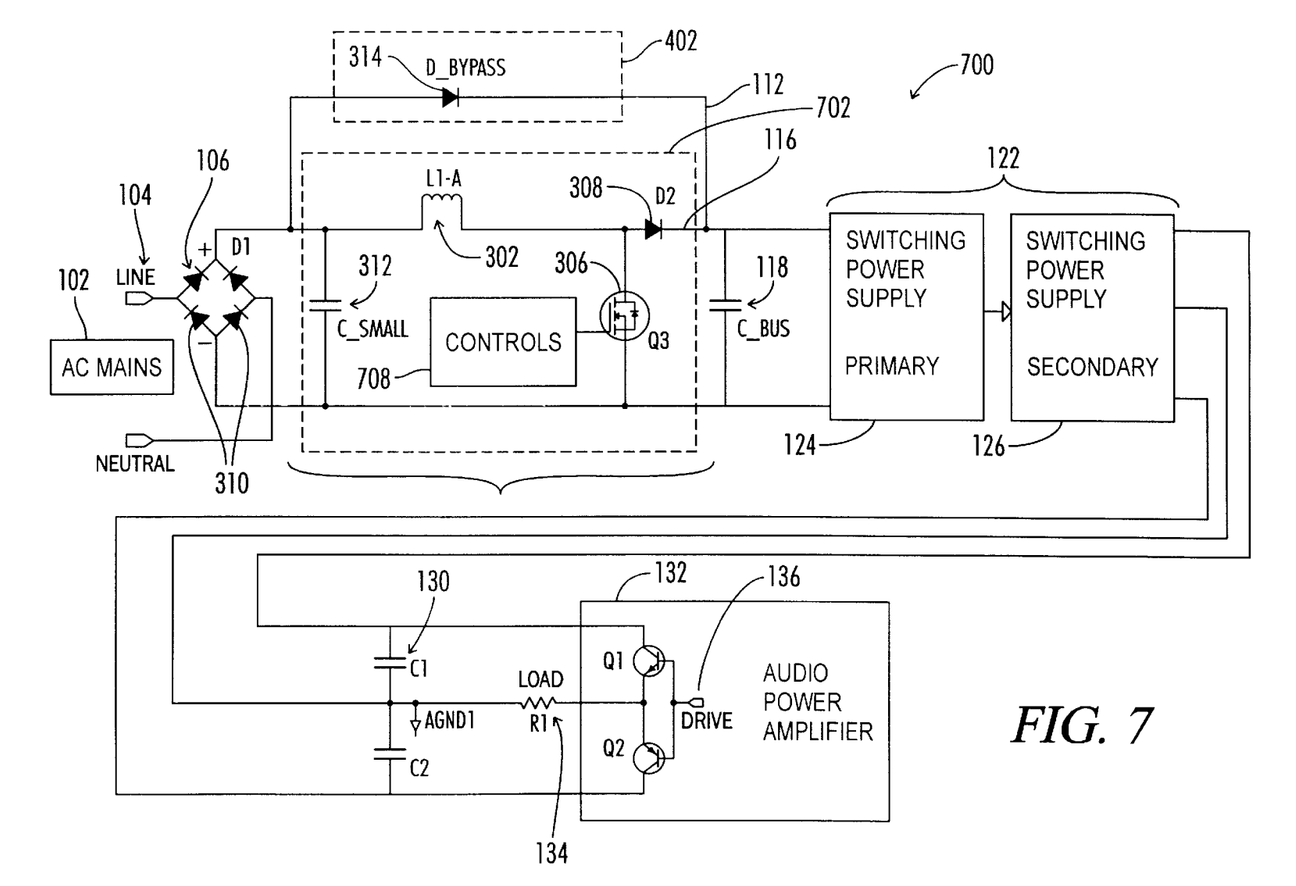
FIG. 7 is an electrical schematic of the preferred implementation of the system of FIG. 4 using a cusp current circuit.

FIG. 7 shows the electrical schematic for cusp audio amplification device 700. As shown in FIG. 7, the rectifier D1 314 feeds the cusp current circuit 404 formed by C_SMALL 312, L1 302, Q3 306, and D2 308. C_BUS 118 is fed by the combination of the cusp current of the first output 116 and the low power factor rectifier current of the second output 112 through D_BYPASS 314. The layout is very similar to the sinusoidal embodiment shown in FIG. 3, with changes to the power factor corrector 702 including the control circuit 708. For this embodiment, the control circuit 708 is adapted to control the demand of the low current power factor corrector 702 to be a cusp wave. Once again, the high current low power factor rectifier 402 operates in both an idle and a supply state. However, the control circuit 708 is adapted to operate the controllable switch 306 to reduce or shut down the low current power factor corrector 702 when the high current low power factor rectifier 402 is operating in the supply state. To achieve a smooth power transition and sinusoidal waveform demand from the AC mains 102 with the high current low power factor rectifier operating in both an idle and supply state, the control circuit 708 is adapted to overlap the first output 116 with the second output 112 so that the combination approximates the incoming sine wave.

There is no specialized control circuitry involved in addition to the normal cusp current power factor correction control circuitry 404, but the limits must be set such that the maximum power delivered by the cusp current circuit 404 is appropriate for the typical draw. The current feedback in the current control loop 708 must monitor total line current, rather than just the cusp current circuit 404 current, as the loop 708 will make the sum of the two track the AC line voltage.

Figure 8:
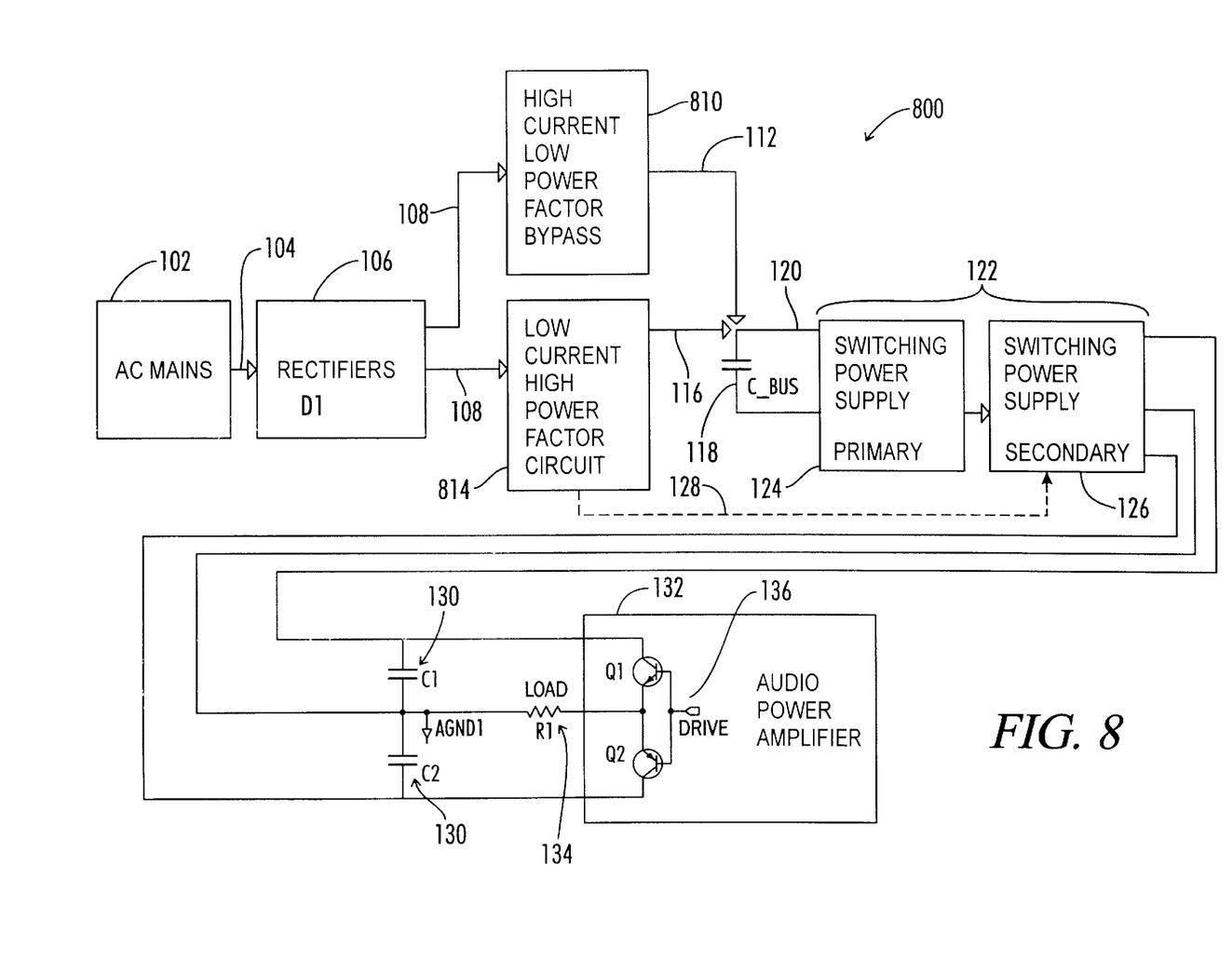
FIG. 8 is a block diagram of an amplifier having a variable power factor.

Alternative Embodiment of Amplifier Having a Variable Power Factor Utilizing a Full to Partial Sine Current Circuit Referring now to FIG. 8, a block diagram is there shown of an audio amplification device 800 having a sinusoidal current draw high power factor circuit 814 and a conventional low power factor supply 122. The audio amplification device 800 is designed to amplify an input audio signal 136 with power from a sine wave power source 102, such as the AC mains found in most residential buildings.

The audio amplification device includes a low current power factor corrector 814 electrically connected between the switching power supply 122 and the input terminals 104. The high power factor circuit 814 draws a current wave form through the rectifier 106 that is proportional to the AC line 102 voltage. The low output high power factor corrector 814 is sized to provide a first output 116 less than the maximum amplifier power draw of the amplifier 136. The high power factor circuit 814 is deliberately limited in capacity to only be capable of supplying high power factor current up to that required by a typical audio output signal of from about ⅛ to ⅓ maximum power. This reduces the size and cost of the components for low current power factor corrector 814.

The low current high power factor circuit 814 may put its first energy either into a primary side 124 or secondary side 126 of the switching power supply 122. The connection of low current high power factor circuit 814 to the primary side 124 is shown via the electrical conduit shown in solid lines and designated by the numeral 116. The alternative connection to the secondary side 126 of power side 122 is shown via an electrical conduit shown in dashed lines and designated by the numeral 128. The connection to primary side 124 via conduit 116 is preferred.

A high current low power factor rectifier 810, also known as a circuit bypass 810, is electrically connected in parallel with the low current power factor corrector 814 at a location between the rectifiers D1 and bus capacitor 118. The high output power factor bypass 810 is adapted to provide a second output 112 and override the first output 116 when the power draw of the amplifier exceeds the first output 116. The first output and second output are used to charge the bus capacitor 118 to provide combined power 120 to the switching power supply 122 including a switching power supply primary 124 and a switching power supply secondary 126. An audio power amplifier 132 is electrically connected to the switching power supply 122 to receive power through the rectifier 106. The output of the switching power supply 122 is connected to filter capacitors 130 before passing to the audio power amplifier 132.

Figure 9A:
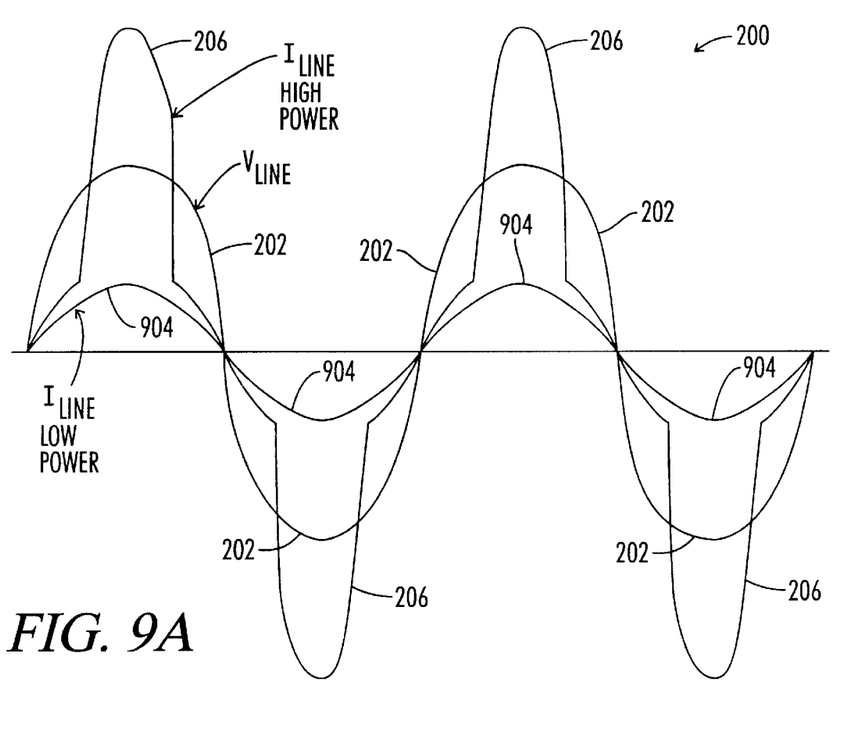
FIGS. 9A and 9B illustrate wave forms utilizing a combination of sinusoidal and cusp/bypass outputs.
Figure 9B:
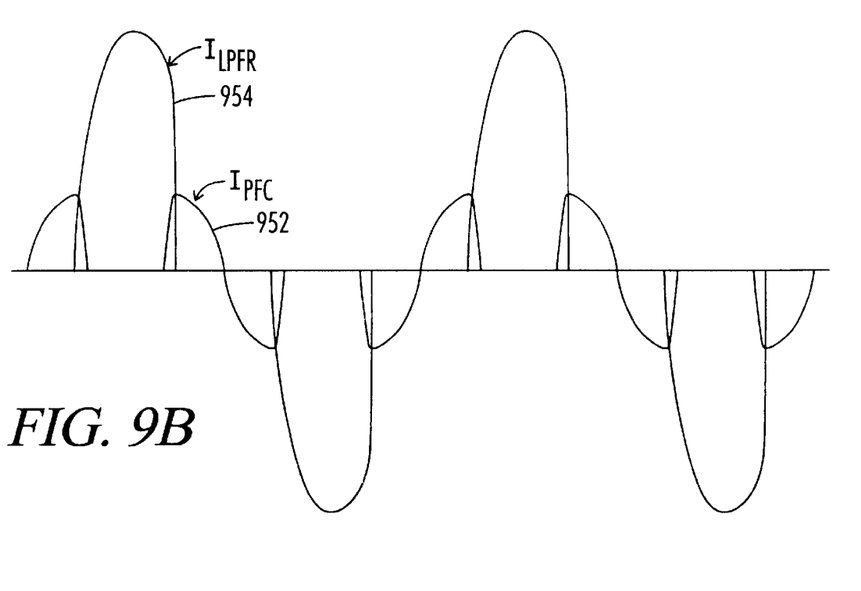

Referring now to FIGS. 9A and 9B, the waveforms for different signals in the audio amplification device 800 may be seen. As is well known, the input voltage is an alternating current signal VLINE as indicated by curve 202. Two different levels of current draw are shown for the audio amplification device 800.

A low level of input current ILINE LOW POWER, is indicated by the sinusoidal curve 904. The ILINE LOW POWER waveform curve 904 is formed with the high power factor circuit 814 when there is no current drawn from the low power factor rectifier 810. The sinusoidal shape provides a high power factor for the device 800.

The high level of input current ILINE HIGH POWER, is indicated by curve 206. The ILINE HIGH POWER waveform curve 206 is formed with the combined first output 116 and second output 112 of the high power factor circuit 814 and low power factor circuit 810. The shape of this waveform may be understood by referencing FIG. 9B.

Figure 10:
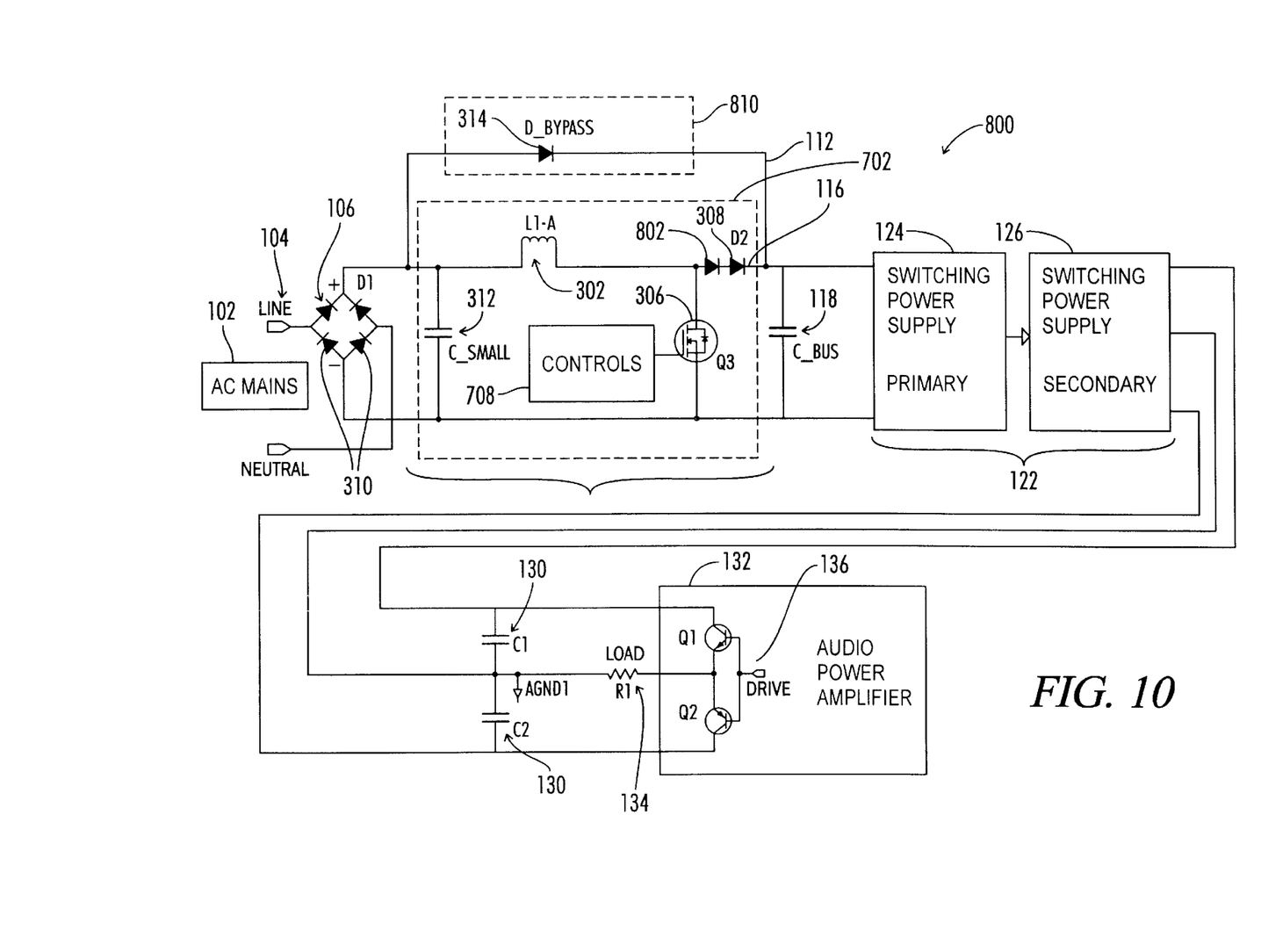
FIG. 10 is an electrical schematic drawing of an implementation of the system of FIG. 8.

As shown in FIG. 9B, when the amplifier power draw exceeds the typical case, as it may under test conditions, the low current power factor corrector is unable to supply enough output current to maintain the voltage on bus cap 118 at a level above the peak of the rectified AC line voltage at 108, forcing the bypass rectifier 810 into conduction. Once the low power factor rectifier 810 becomes active, it draws current as shown as ILPFR and designated by curve 954. The series voltage drop across bypass diode 810 is lower than the series voltage drop across the low current power factor corrector 814, which prevents any current flow through the low current high power factor rectifiers 308, 802 during the conduction time of bypass rectifier 810. This is achieved either by selecting a high current bypass rectifier 810 with a lower drop than a single diode 308 used in the power factor corrector circuit 814, or by using two series diodes 308, 802 in the power factor corrector circuit 814 as shown in FIG. 10. The sum of the two currents ILPFR and IPFC is shown as ILINE HIGH POWER designated as curve 206 in FIG. 9A.

FIG. 10 is an electrical schematic of the implementation of the system of FIG. 8 using the combined sinusoidal and cusp current circuit. As shown in FIG. 10, the bridge rectifier D1 formed from diodes 310 feeds the high power factor circuit 814 formed by C_SMALL 312, L1 302, Q3 306, D2 308, and D3 802. The inductance L1 302 and the diodes D2 308 and D3 802 are series connected and positioned in the path of the direct current signal from the rectifier 106. A controllable switch Q3 306 is connected between the inductance L1 302 and the diode D2 308 and positioned across the direct current signal from the rectifier 106. A control circuit 304 is connected to the controllable switch 306 and adapted to control the demand of the low current power factor corrector 814 through the rectifier 106 to be a continuous sine wave at low power demand to substantially match the alternating current signal from the alternating current mains 102.

C_BUS 118 is fed by this high power factor circuit 814 until the amplifier power draw exceeds it's capability, then the low power factor rectification path through diode D_Bypass 314 takes over. One advantage to this simple system is that there is no specialized control circuitry involved over the normal power factor correction control circuitry 304

The limits of the low current power factor corrector 814 must be set such that the maximum power delivered by the low current power factor corrector 814 is appropriate for the typical draw and the maximum power delivered by the combination of both outputs 116, 112 is appropriate for the maximum amplifier power draw. By setting the limit on the low current power factor corrector 814 at the typical power draw, power draw requirements from the amplifier 122 above this capability will drop the voltage on C_BUS 118 until D_BYPASS 314 is biased and activates to provide the alternative path. The drop across D_Byass will be smaller than the series drop across L1 302, D2 308, and D3 802, ensuring that no current will flow through the low current power factor corrector circuit while the high current low power factor rectifier is active. This is the reason for using two diodes in series instead of a single diode in the power factor corrector circuit. Alternatively, this may be accomplished by selecting a low forward voltage drop rectifier for D_bypass 314 and a high forward voltage drop rectifier for D2 308 and ommitting D3 802.

In this manner, a method of controlling the power factor of demanded amplifier power against an incoming power flow for an audio amplifier is provided. The method includes the provision of a first power flow circuit adapted to apply a first level of power factor correction to the demanded power in relation to the incoming power flow and a second power flow circuit with a low power factor as an alternative to the first power flow circuit. The method continues by operating the power flow circuits to provide a combined power factor correction for the demanded amplifier power.

As taught by the audio amplification device 400 which contains a cusp current power factor correction circuit 404, this method includes operating the first power flow circuit during low levels of demanded power output; and operating only the second power flow circuit during high levels of demanded power output. In this manner, after the rectification of the AC signal, the first portion of the direct current power is corrected to achieve a cusp wave demand at the input to the rectifier and the second portion of the direct current power is controlled to achieve a spike wave demand at the rectifier input. These signals may then be combined such that the cusp wave demand and the spike wave demand achieve a substantially sinusoidal wave signal shape for the input demand for the rectifier.

Alternatively, the audio amplification device 800 with the sinusoidal current draw high power factor circuit 114 teaches the method for operating the first power flow circuit during low levels of demanded power output and operating both the first and second power flow circuits during high levels of demanded power output. This uses a step of correcting the first portion of the direct current power to achieve a substantially sine wave signal shape for the input demand.

The audio amplification device 800 with the sinusoidal current draw high power factor circuit 814 teaches the method for exclusively operating the first power flow circuit during low levels of demanded power output and exclusively operating the second power flow circuit during high levels of demanded power output. This uses a step of correcting the first portion of the direct current power to achieve a substantially sine wave signal shape for the input demand.

Each of the embodiments teach the use of a bypass diode in a method for rectifying the incoming sine wave power to provide a direct current power to satisfy the demanded amplifier power by adjusting the draw of a first portion of the direct current power at a first level to improve the power factor of an input demand at the rectifier to provide a first part of the demanded amplifier power, and transferring a second portion of the direct current power without power factor correction to provide a second part of the demanded amplifier power.

Thus, these designs teach a device which utilizes a low current power factor corrector including an inductance and at least one diode in series, positioned in the path of the direct current signal, a controllable switch connected between the inductance and the diode and positioned across the direct current signal, and a control circuit connected to the controllable switch, the low current power factor corrector sized to provide a first output less than the maximum amplifier power draw of the amplifier, and a bypass diode connected in parallel with the low current power factor corrector between the amplifier and the input terminals, the bypass diode adapted to provide a second output to supplement the first output when the amplifier power draw exceeds the first output. The first embodiment teaches the control circuit being adapted to control a corrected demand of the low current power factor corrector to substantially be a continuous sine wave. The second embodiment teaches the control circuit being adapted to control a corrected demand of the low current power factor corrector to substantially be a cusp wave which may be combined with a bypass diode having an associated bypass demand, wherein a combination of the corrected demand and the bypass demand substantially forms a sine wave.

Thus, it is seen that the systems of the present invention readily achieve the ends and advantages mentioned as well as those inherent therein. While certain preferred embodiments have been illustrated and described for purposes of the present disclosure, numerous changes in the arrangement and construction of parts and steps may be made by those skilled in the art, which changes are encompassed within the scope and spirit of the present invention as defined by the appended claims.

What is claimed is:

1. An audio amplification device for amplifying an input audio signal with power from a sine wave power source, the device comprising:

input terminals adapted to receive the power from the sine wave power source;

a rectifier electrically connected to the input terminals and adapted to convert the power from the sine wave power source to a rectified sine wave signal;

an amplifier electrically connected to the rectifier and adapted to amplify the audio input signal using the direct current power signal, the amplifier having an operational power draw up to a maximum power draw;

a low current power factor corrector electrically connected between the amplifier and the input terminals, the low current power factor corrector sized to provide a first output less than the maximum amplifier power draw of the amplifier; and a high current low power factor rectifier electrically connected in parallel with the low current power factor corrector between the amplifier and the input terminals, the high output power factor bypass adapted to provide a second output to supplement the first output when the amplifier power draw exceeds the first output.

2. The device of claim 1, the low current power factor corrector comprising:

an inductance and at least one diode series connected in the path of the direct current signal;

a controllable switch connected between the inductance and the diode and positioned across the direct current signal; and a control circuit connected to the controllable switch.

3. The device of claim 1, control circuit adapted to control demand of the low current power factor corrector to be a continuous sine wave.

4. The device of claim 1, the high current low power factor rectifier operating in an idle and supply state, the control circuit adapted to operate the controllable switch only when the high current low power factor rectifier is not conducting.

5. The device of claim 1, control circuit adapted to control the demand of the low current power factor corrector to be a cusp wave.

6. The device of claim 1, the high current low power factor rectifier operating in an idle and supply state, the control circuit adapted to operate the controllable switch to shut down the low current power factor corrector when the high current low power factor rectifier is operating in the supply state.

7. The device of claim 6, the high current low power factor rectifier operating in an idle and supply state, the control circuit adapted to overlap the first output with the second output.

8. The device of claim 1, the high current low power factor rectifier adapted to detect amplifier power draw exceeding the first output and switch from an idle state to a supply state.

9. The device of claim 1, the high current low power factor rectifier adapted to detect the first output exceeding the amplifier power draw and switch from a supply state to an idle state.

10. The device of claim 1, the high current low power factor rectifier comprising:

a bypass diode connected in parallel with the low current power factor corrector.

11. A method of controlling power factor of demanded amplifier power against an incoming power flow for an audio amplifier, the method comprising:

providing a first power flow circuit adapted to apply a first level of power factor correction to the demanded power in relation to the incoming power flow;

providing a second power flow circuit with a second level of power factor correction as an alternative to the first power flow circuit;

operating the power flow circuits to provide a combined power factor correction for the demanded amplifier power.

12. The method of claim 11, further comprising:

operating the first power flow circuit during low levels of demanded power output; and operating only the second power flow circuit during high levels of demanded power output.

13. The method of claim 11, further comprising:

operating the first power flow circuit during low levels of demanded power output; and operating both the first and second power flow circuits during high levels of demanded power output.

14. A method of controlling power factor of demanded amplifier power against an incoming sine wave power flow for a direct current audio amplifier, the method comprising:

rectifying the incoming sine wave power to provide a direct current power to satisfy the demanded amplifier power;

adjusting the draw of a first portion of the direct current power at a first level to improve the power factor of an input demand at the rectifier to provide a first part of the demanded amplifier power; and transferring a second portion of the direct current power without power factor correction to provide a second part of the demanded amplifier power.

15. The method of claim 14, wherein adjusting comprises:

correcting the first portion of the direct current power to achieve a substantially sine wave signal shape for the input demand.

16. The method of claim 14, wherein adjusting comprises:

correcting the first portion of the direct current power to achieve a cusp wave demand; and controlling the second portion of the direct current power to achieve a spike wave demand; and combining the cusp wave demand and the spike wave demand to achieve a substantially sine wave signal shape for the input demand.

17. An audio amplification device for amplifying an input audio signal with power from a sine wave power source, the device comprising:

input terminals adapted to receive the power from the sine wave power source;

a rectifier electrically connected to the input terminals and adapted to convert the power from the sine wave power source to a direct current power signal;

an amplifier electrically connected to the rectifier and adapted to amplify the audio input signal using the direct current power signal, the amplifier having an operational amplifier power draw up to a maximum amplifier power draw;

a low current power factor corrector including an inductance diode series positioned in the path of the direct current signal, a controllable switch connected between the inductance and the diode and positioned across the direct current signal, and a control circuit connected to the controllable switch, the low current power factor corrector sized to provide a first output less than the maximum amplifier power draw of the amplifier; and a bypass diode connected in parallel with the low current power factor corrector between the amplifier and the input terminals, the bypass diode adapted to provide a second output to supplement the first output when the amplifier power draw exceeds the first output.

18. The device of claim 17, control circuit adapted to control a corrected demand of the low current power factor corrector to substantially be a continuous sine wave.

19. The device of claim 17, control circuit adapted to control a corrected demand of the low current power factor corrector to substantially be a cusp wave.

20. The device of claim 19, the low current power factor corrector having an associated corrected demand and the bypass diode having an associated bypass demand, wherein a combination of the corrected demand and the bypass demand substantially forms a sine wave.

* * * * *